United States Patent Office 3,462,252
Patented Aug. 19, 1969

3,462,252
METHOD OF FORMING A GLASS BODY OF DE-VITRIFIABLE GLASS AND DEVITRIFYING THE SAME
Frank Veres, Toledo, Ohio, assignor to Owens-Illinois, Inc., a corporation of Ohio
No Drawing. Filed Sept. 11, 1964, Ser. No. 395,902
Int. Cl. C03b *23/20, 29/00*
U.S. Cl. 65—18                         10 Claims

ABSTRACT OF THE DISCLOSURE

Devitrified articles made by mixing together at least two different glasses in powdered form, one of the glasses, referred to as the first glass, being a devitrifiable glass and composing at least 10% by volume of the mixture and having a devitrification temperature at least 100° C. below the fiber softening temperature of at least 55% by volume of the total glass in the mixture, heating said mixture to at least the devitrification temperature of the first glass, maintaining the mixture thereat to cause devitrification of the first glass and thereby form a continuous skeletal network of devitrified glass with the mixture, and then further heating the mixture to within 10° C. of the fiber softening temperature of the remaining glass in the mixture without exceeding the liquidus temperature of the devitrified glass, then permitting the mixture to cool to a temperature below the fiber softening temperature of the remaining glass in the mixture to form another continuous skeletal network interlocking in and around the skeletal network formed by the devitrification of the first glass.

---

The present invention relates broadly to shaped bodies of at least partially devitrified glass and their method of formation such as are of the general categoric nature of those types of molded glass articles produced by powdered glass-sintering procedures. In a more particular aspect, the present invention pertains to shaped glass bodies of the type which are composed of at least two different discernible glass compositions and which are characterized by having at least one of the glass compositions providing a rigid skeletal lattice or network structure of devitrified glass extending randomly throughout and interlocking with the other one or more glass compositions. Correspondingly, the present invention pertains in another more particular aspect of the method of forming shaped glass bodies having such novel characteristics.

In accordance with previously known methods for producing glass articles from powdered glass, it has been common practice to mold the powdered glass together with a suitable binder under high pressure and thereafter heat the molded body sufficiently to cause an interfacial sintering or bonding of the glass particles. To prevent deformation or loss of shape, the heating, of necessity, must be carefully limited to an extent whereby only the surfaces of the glass particles are permitted to soften. As a consequence, only a very limited degree of interfacial fusion or bonding is achieved, depending somewhat upon the degree of packing of the pressed glass particles. As a further consequence, the resultant article manifests a high degree of porosity and relatively low strength. Additionally, in instances where it is desired to increase the ultimate strength of the resultant body, as by increasing the degree of interfacial fusion between the particles, increased heating is required which, of course, produces increased softening of the particles. As a result there is an attendant reduction in the rigidity of the pressed body and danger of impairment to or deformation of the shape imparted by the prior pressing operation.

As contrasted with previously known methods wherein a reduction in porosity ordinarily can only be readily accomplished by the use of higher temperatures which tend to cause the pressed article to loose its pre-pressed shape, the present invention embodies as one of its principal objectives the provision of an article formed from powdered glass which is essentially non-porous in character and closely conforms to the pressed configuration initially imparted to the powdered glass.

Another object of the present invention is the provision of an article formed from powdered glass which is characterized by being composed of at least two different and discernible glasses cooperating to form an interlocking non-porous skeletal network within the body structure of the article and which is further characterized by having a devitrified glass as one of the glasses of which the article is composed.

Another object of the present invention is to provide a shaped body composed of different glasses, at least one which is a devitrifiable glass possessing a devitrification temperature substantially below the fiber softening temperature of the other glass or glasses.

Another objective of the present invention is the provision of a method whereby pressed bodies of powdered glass may be heat-fused to form an esesntially non-porous article without the occurrence of damaging deformation during the heat-fusion process.

A further objective of the present invention is the provision of a shaped body produced by the steps of pressure pre-shaping a mixture of different glasses composed of at least 10%: by volume of a devitrifiable glass having a devitrification temperature substantially below the fiber softening temperature of the remaining glass, heating such mixture to the devitrification temperature of the devitrifiable glass, maintaining the devitrifiable glass at said devitrification temperature for a sufficient length of time to cause devitrification of said devitrifiable glass and to thereby form a crystalline skeletal lattice of devitrified glass within the shaped mixture, and thereafter heating the mixture to a temperature above the fiber softening temperature of the remaining glass in the mixture to render the mixture essentially non-porous.

A still further objective of the present invention is the provision of a powdered glass mixture composed of between 10% and 45% by volume of devitrifiable glass having a devitrification temperature below the fiber softening temperature of the remaining glass.

A further objective of the present invention is the provision of a mixture having the characteristics of the last-mentioned objective and which when subjected to a temperature corresponding to the devitrification temperature of the devitrifiable glass will transform into a rigid shape-retaining structure of sufficient rigidity to preclude deformation of the remaining glass upon subsequently raising the temperature to a temperature approximating the fiber softening temperature of the remaining glass.

A still further objective of the present invention is tthe provision of a method for the accomplishment of each and all of the foregoing objects.

Additional objects and advantages will become readily evident to those skilled in the art from the following detailed description and the various preferred and representative examples therein appearing.

It has been ascertained in accordance with the concepts of the present invention that it is possible to transform preshaped bodies of powdered glass into essentially non-porous structures of greatly increased strength. Furthermore, such transformation can be ordinarily accomplished without incurring damaging deformation of the pre-shaped configuration of the bodies. In a broad sense, it has been ascertained that such improved results may be attained by utilizing a mixture composed of at least two different powdered glasses having compatible coefficients of expansion provided at least one of such powdered glasses is a powdered devitrifiable glass.

In more specific respects the powdered glasses of which the mixture is composed are selected to have coefficients of thermal expansion preferably not differing by more than about $10 \times 10^{-7}$ per ° C. between 0° and 300° C. Additionally, the relationship between the powdered devitrifiable glass and the other powdered glass of the mixture is such that the devitrifiable glass constitutes at least ten percent by volume of the mixture and possesses a temperature of devitrification which is at least 100° C. below the fiber softening temperature of at least fifty-five percent of the other powdered glass in the mixture. To provide greater precaution against deformation of the pre-shaped mixture, however, the powdered glass constituents are more preferably selected to provide a relationship in which the temperature of devitrification of the devitrifiable glass is at least 100° C. below the fiber softening temperature of at least seventy percent of the other powdered glass constituents in the mixture. In some instances, depending upon various factors such as, among others, initial size and shape of the pressed mixture, rate of heating and rate of devitrification, it may be desirable to utilize a mold or die or other suitable means during the heating process for the purpose of aiding in the support or retention of the pre-shaped configuration of the pressed mixture or body.

Utilizing powdered glasses selected in accordance with the foregoing concepts of the present invention, the powdered glass constituents are thoroughly admixed and intimately blended together and thereafter pre-shaped by shaping procedures such as those previously mentioned and which are well-known to those familiar with conventional sintering techniques. Thereafter, the shaped, powdered glass body is subjected to the influence of heat to raise the temperature thereof to a temperature corresponding to the devitrification temperature of the devitrifiable glass component. At this temperature the devitrifiable component is caused to devitrify and consequently rigidify into a crystalline skeletal network extending substantially continuously throughout the shaped body. During the interval in which the devitrifiable glass undergoes softening and subsequent devitrification the remainder of the powdered glass being substantially below its fiber softening temperature imparts sufficient overall rigidity to the body to preclude deformation thereof. Thereafter, the partially devitrified body is subjected to the influence of additional heat to increase the temperature thereof to a temperature corresponding to at least the fiber softening temperature of the other powdered glass constituent or constituents. At the latter temperature, or temperatures, the remaining powdered glass or glasses are caused to soften and flow within and around the crystalline network of devitrified glass which functions to retain the overall shape and configuration of the body during this phase of the heating process. Subsequent cooling of the article thereafter accomplishes a hardening of the softened glass into a continuous skeletal lattice or network which is interlocked in and around the previously formed skeletal network of devitrified glass, and which together with the devitrified glass forms a resultant non-porous article of high strength. Thus, the method of the present invention is such that while the devitrifiable glass is undergoing transformation to a relatively fluid state prior to devitrification, the remaining powdered glass acts as a retaining influence precluding deformation of the article, whereas after devitrification of the devitrifiable portion, the resulting devitrified lattice or network provides adequate rigidity to preclude deformation during the transition of the remaining glass from a powdered solid to a highly viscous fluid state of transformation, i.e. the remaining glass serves to preclude deformation of the article while the devitrifiable glass is rendered relatively fluid prior to devitrification and the devitrifiable glass, after devitrification, in turn imparts or lends stability and rigidity to the article during the transformation of the remaining glass from a solid to a relatively fluid state or condition.

In carrying out the formation of a shaped article from a shaped powdered glass, it should be kept in mind that the broad concepts of the present invention are such that the powdered glass composition is a composite of at least two glass compositions and may be composed of three or more powdered glass compositions, provided that at least part of the composition be constituted by a devitrifiable glass having a devitrification temperature substantially lower, e.g. 100° C. lower, than the other glasses making up the overall powdered glass mixture. More particularly in this regard the other powdered glass or glasses employed with the basic devitrifiable glass may be entirely non-devitrifying glass or glasses, or entirely devitrifying glass or glasses, or a combination of both devitrifying and non-devitrifying glasses. Exemplifying one such aspect of the invention, there is set forth hereinafter a generalized version of the method of the present invention as it would pertain to a binary mixture composed of a devitrifiable glass and a non-devitrifiable glass. Initially the glasses are selected so that when annealed they do not possess a relative difference in coefficients of thermal expansion and contraction which is greater than $10 \times 10^{-7}$ per degree C. throughout the temperature range of 0° C. and 300° C. Further, they are selected so that the devitrifiable glass will possess a temperature of devitrification at least 100° C. lower than the fiber softening temperature of the non-devitrifiable glass. A still further requisite, of course, is that the non-devitrifiable glass have a fiber softening temperature lower than the liquidus temperature of the devitrifiable glass when the latter is in a devitrified condition.

The devitrifiable glass and the non-devitrifiable glass selected to possess such properties of compatibilty are both prepared in finely comminuted or powdered form with the particle size range of each being preferably between about 100 mesh and 300 mesh screen size. The glasses in such finely comminuted or powdered form are then intimately mixed or blended together to form a uniformly mixed composite thereof. Alternatively, the glasses may be admixed before being reduced to a comminuted of powdered form in which instance the comminuting and mixing steps may be carried out simultaneously. The relative proportions by volume of the glasses when mixed together is such that the devitrifiable glass constitutes between approximately 10% and 45% and the non-devitrifiable glass constitutes between about 55% and 90% of the binary mixture. More preferably, however, the devitrifiable glass constitutes between 10% and 30% by volume and the remaining non-devitrifiable glass constitutes between 70% and 90% by volume. Although not always necessary, in some instances, as is conventional in the art of sintering of pressed powders, it may be desirable to include a binder in the mixture. Among others, any of several binders, such as biphenyl, wax, paraffin, polyethylene or other conventional resinous binder material, may be employed. Ths mixture is then pressed, either with or without a binder, to the desired configuration or shape. Thereafter, the pressed and shaped mixture is fired by first heating the mixture at a rapid rate to a firing temperature above the beginning devitrification temperature of the devitrifiable glass but not higher than 100° C. below the fiber softening temperature of the non-devitrifiable glass. Upon substantially complete devitrification of the devitrifiable glass, the firing temperature is increased to a temperature, or temperatures, intermediate the fiber softening temperature of the non-devitrifiable glass and the liquidus temperature of the devitrified glass. The firing is then continued at the latter temperature, or temperatures, until the non-devitrifiable glass has become sufficiently soft to cause the particles thereof to fuse together and with the devitrified glass and thereby form a non-porous continuous network in and around the devitrified glass. Thereafter, the mixture is cooled or permitted to cool to form a rigid structure which will exhibit the shape characteristics of the initially pressed mixture. Preferably, the mixture is also annealed in conventional manner to relieve such internal stresses as may occur during cooling.

Shaped bodies or articles prepared in accordance with foregoing broad concepts may be produced which are remarkably free from noticeable or appreciable deformation. Additionally, the resultant product is, by contrast with products prepared in accordance with previous known sintering methods, of a non-porous character and possesses relatively high strength. In this respect, it would appear that the relatively high strength, as well as the retention of shape or configuration characteristics, attends the formation of a non-porous structure composed of a continuous skeletal network of devitrified glass which is interlocked with and bonded to a continuous skeletal network of non-devitrified glass. In somewhat explanatory fashion, during the early stages of firing the devitrifiable glass melts and fuses together to form a continuous skeletal network extending throughout the pressed mixture. During the melting phase of the devitrifiable glass, the rigid particles of non-devitrifiable glass impart a high overall viscosity, as well as a substantial degree of ridigity, to the mixture which is sufficient to prevent slumping or deformation. Thereafter, devitrification of the devitrifiable glass, which occurs prior to flowable, heat-softening of the non-devitrifiable glass, causes the devitrifiable glass to form a rigid skeletal network extending throughout the mixture and around the particles of non-devitrifiable glass. The rigid skeletal network of devitrified glass then retains the pressed shape and precludes deformation or slumping of the mixture when the non-devitrifiable glass softens and fuses together to form its own continuous skeletal network within and and around the rigid network of devitrified glass. Additionally, the softening and fusing of each of the respective glasses tends to obviate the high degree of porosity normally attending conventional sintering procedures.

Utilizing a binary system composed of two devitrifiable glasses the same general conditions would apply as were discussed above with respect to a devitrifiable and non-devitrifiable binary glass mixture. For example, the selection of devitrifiable glasses having similarly compatible coefficients of expansion and having a differential of at least 100° C. between the devitrification temperature of the one glass and the fiber softening temperature of the other glass would be followed, as before. Likewise, the heating cycle would follow the same pattern except that the final heating would be extended up to a temperature at or slightly above the devitrification temperature of the glass possessing the higher devitrification temperature of the two powdered glasses. The resultant product in this instance, after cooling, would be composed essentially, or almost entirely, of devitrified glass and both glasses would form interlocking lattice networks of devitrified glass embodied in a rigid and essentially non-porous overall body structure.

Other more complex systems of powdered glass systems are also contemplated within the purview of the invention. For example in conjunction with the basic powdered devitrifiable glass there may be employed another powdered devitrifiable glass and a powdered non-devitrifiable glass. Similarly several powdered devitrifiable glasses might be employed. In all instances, however, caution should be exercised in the selection of the various devitrifiable or non-devitrifiable glasses so as to avoid the occurrence of a cumulative softening effect upon the pressed mixture during the heating or firing cycle. In this regard care should be taken to select glasses which would not cause the overall viscosity of the pressed body or article to be reduced below approximately $10^{7.6}$ poises during the course of the heating or firing cycle. Also, care should be exercised to select glasses having compatible coefficients of thermal expansion, such compatibility ordinarily being achieved by not exceeding a differential of thermal expansion on the order of $10 \times 10^{-7}$ per ° C.

Several preferred examples of glass compositions and mixtures thereof suitable for use in accordance with the foregoing broad concepts and generalized version are set forth hereinafter. Among the following examples, there is shown a binary mixture utilizing a devitrifiable glass with a non-devitrifiable glass. Another example is illustrative of a binary mixture composed of two devitrifiable glasses. Still another example is illustrative of a ternary mixture composed of a devitrifiable glass in combination with another devitrifiable glass and a non-devitrifiable glass.

More specifically, Example I, below, is representative of a preferred binary mixture in which a devitrifiable glass having a composition corresponding to Glass–1 is intimately admixed in powdered form with a non-devitrifiable glass having a composition corresponding to Glass–2.

EXAMPLE I

| Theoretical oxide content | Percent by weight | |
|---|---|---|
| | Glass–1 | Glass–2 |
| PbO | 17 | |
| $B_2O_3$ | 14 | |
| ZnO | 50 | |
| $SiO_2$ | 19 | 61.4 |
| $Al_2O_3$ | | 18.8 |
| CaO | | 12.0 |
| MgO | | 7.8 |
| | 100 | 100.0 |

The powdered devitrifiable glass, e.g., Glass–1 in its devitrified state possesses a coefficient of thermal expansion over the temperature range of 0 to 300° C. on the order of $44.4 \times 10^{-7}$ per ° C. Glass–1 is further characterized by having a fusion temperature range of 570° C. to 620° C., a devitrification temperature of approximately 620° C. and a liquidus temperature, when devitrified, in excess of 1150° C. By relative comparison the powdered non-devitrifiable glass having the composition of Glass–2 possesses a closely matched coefficient of thermal expansion over the temperature range of 0 to 900° C. on the order of $43 \times 10^{-7}$ per ° C. and has a fiber softening temperature of approximately 954° C.

In carrying out the method of this invention, Glass–1 and Glass–2 are intimately mixed and blended together in powdered form to produce a binary mixture which is composed of between 10 percent and 45 percent by volume of Glass–1 with the remainder being Glass–2. To the mixture there is preferably added a small amount of binder, such as 3 percent by weight of biphenyl. The mixture is then pressed, or otherwise shaped, to conform to the desired shape or configuration. Pressures on the order of 3000–5000 p.s.i. will ordinarily suffice to form the shape desired and impart adequate rigidity to permit careful handling and subsequent firing without impairment of the pre-formed shape. Thereafter, the pressed and shaped mixture, or body, is heated or fired.

The firing is carried out by initially heating the shaped mixture rapidly to a temperature between 620° C. and 855° C. whereupon Glass–1, which melts and fuses between 570° C. and 620° C., is caused to devitrify and form a rigid skeletal network or lattice extending throughout the shaped mixture or body. Thereafter, the temperature is increased to raise the temperature of the shaped mixture to within plus or minus 10° C. of the fiber softening temperature of Glass–2, such temperature being 955° C. In this latter respect it is preferable that the temperature not exceed by more than 10° C. the fiber softening temperature of the non-devitrifiable glass in order to safeguard against the prospect of too great a reduction in the viscosity of the non-devitrifiable glass. The shaped mixture is then maintained at the latter temperature for sufficient time to permit the non-devitrifiable glass to thoroughly fuse together with the devitrified glass. Thereafter, the mixture or body is cooled and preferably annealed in conventional manner to substantially remove internal stresses developed during cooling.

In accordance with a further concept of the present invention, the composite shaped mixture, or body may consist entirely of devitrifiable glass. The ultimate product from such mixture will be a completely, or essentially completely, devitrified body. An example of a binary system consisting entirely of devitrifiable glass is represented by the glass compositions appearing in Example II following.

EXAMPLE II

| Theoretical oxide content | Percent by weight | |
|---|---|---|
| | Glass-3 | Glass-4 |
| PbO | 46.0 | 34.0 |
| B₂O₃ | 18.0 | 37.0 |
| ZnO | 34.0 | 28.0 |
| CuO | | 1.0 |
| SiO₂ | 2.0 | |
| Total | 100.0 | 100.0 |

The essential physical characteristics of Glass-3 and Glass-4 were determined to be as follows:

| | Glass-3 | Glass-4 |
|---|---|---|
| Coeff. of thermal exp. (0–300° C.×10⁷/° C.) | 63.9 | 55 |
| Devitrification temp. (0° C.) | 450 | 625 |
| Fiber softening temp. (° C.) | | 568 |

In similar manner as previously described with respect to the glass compositions of Example I, the glass compositions of Example II are prepared and mixed together in such manner that the proportions of Glass-3 constitute between 10% and 45% by volume of the mixture and Glass-4 constitutes the remainder, e.g. between 55% and 90% by volume of the total mixture. The mixture is then pressed to shape and fired either with or without binder, as in the preceding example. During the firing process, the mixture is heated to a temperature between 450° C. and 465° C. whereupon Glass-3 is caused to devitrify and form a rigid skeletal network or lattice extending throughout the pressed body. Subsequently, Glass-4 is similarly caused to devitrify by increasing the temperature of the shaped body to a temperature between about 625° C. and 635° C. As the result, the final product, after cooling, is a non-porous composite of interlocking networks of two devitrified glasses and possesses extremely high strength. Furthermore, the result is achieved without damaging deformation or loss of shape of the body during the firing and devitrification process.

In accordance with a still further concept, the composite shaped mixture, or body, may be composed of more than a two component system of powdered glasses. Example III, below, is representative of such a system and depicts a suitable ternary system composed of two different powdered devitrifiable glasses, namely Glass-5 and Glass-6 and a powdered non-devitrifiable glass, namely Glass-7.

EXAMPLE III

| Theoretical oxide content | Percent by weight | | |
|---|---|---|---|
| | Glass-5 | Glass-6 | Glass-7 |
| SiO₂ | 2.0 | 2.0 | 56.5 |
| Al₂O₃ | | | 1.5 |
| Na₂O | | | 3.7 |
| K₂O | | | 8.8 |
| CaO | | | 0.2 |
| PbO | 75.92 | 71.22 | 29.3 |
| B₂O₃ | 9.25 | 9.95 | |
| ZnO | 12.83 | 15.83 | |
| SnO₂ | | 1.0 | |
| Total | 100.0 | 100.0 | 100.0 |

The physical characteristics of Glass-5 are such that it possesses a coefficient of thermal expansion between 0° and 300° C. on the order of 92×10⁻⁷ per ° C. in its devitrified state, a fiber softening temperature of 373° C., a devitrification temperature of 405° C. and a liquidus temperature when devitrified which is substantially in excess of 650° C. With regard to Glass-6 the glass in its devitrified state exhibits a coefficient of thermal expansion between 0° and 300° C. on the order of 93.5×10⁻⁷ per degree C., a fiber softening temperature of 397° C., a devitrification temperature beginning at 440° C. and a liquidus temperature for the devitrified glass substantially in excess of 650° C. Glass-7, the non-devitrifiable glass component, exhibits such physical properties as having a fiber softening temperature of 632° C. and a coefficient of thermal expansion between 0° and 300° C. on the order of 90×10⁻⁷ per degree C.

Utilizing powdered glasses having the compositions set forth above in Example III a glass mixture is prepared in which the total amount of Glass-5 together with Glass-6 constitutes between 10 percent and 45 percent by volume of the mixture with Glass-7 constituting the remaining 55 percent to 90 percent by volume. The mixture with a small amount of added binder is then shaped under a pressure of between 5,000–10,000 p.s.i. and thereafter fired.

The firing of the shaped mixture is carried out by initially heating the shaped mixture, or body, to a temperature in the range of 405°–440° C. and thereafter gradually firing the sample to a temperature of 632° C., plus or minus about 10° C.

Following the method of Example III the devitrifiable Glass-5 will commence to devitrify at a temperature of 405° C. and at a temperature of approximately 440° C. Glass-6 will commence to devitrify, with both glasses being essentially completely devitrified upon gradual heating to a temperature of 450° C. Upon continued firing to a temperature within plus or minus 10° C. of 632° C., the non-devitrifiable glass, i.e., Glass-7, will fuse with the interlocked skeletal network of devitrified glass formed by the prior devitrification of Glass-5 and Glass-6.

In each of the foregoing exemplary instances the resultant shaped product possesses rigid and continuous skeletal network or lattice of devitrified glass which not only imparts substantial strength to the product but also is quite completely interlocked in and around the other glass which may be either vitreous or devitrified. In each of the foregoing instances the network of devitrifiable glass also imparted substantial rigidity to the shaped body during the heat-fusion process and functioned to prevent the body from slumping or incurring damaging loss of shape while at the same time permitting the use of temperatures of sufficient magnitude to permit the formation of an essentially non-porous structure.

In the foregoing description and the following claims, the term "devitrifiable," as it pertains to certain glasses, or glass compositions, herein, is intended to mean a powdered glass, or glass composition, which when subjected to continuously increasing temperatures will at some given temperature or temperature range above its fiber softening temperature begin to increase in viscosity and crystallize. The use of the term "non-devitrifiable" as it pertains to certain glasses or glass compositions herein is intended to mean a glass or glass composition which upon being heated above its fiber softening temperature will not crystallize in powdered form to an extent sufficient to increase the fiber softening temperature of the glass or glass composition, when thereafter solidified and reduced to powdered form, by more than 20° C.

The foregoing examples are merely descriptive of some preferable glasses and glass compositions suitable for the practice of the present invention. Other glasses and glass compositions may also be employed either as substitutes for the glasses and glass compositions described or in conjunction therewith to achieve enhanced properties particularly suitable for certain applications of the resultant product of the present invention. For example many other devitrifiable and non-devitrifiable glasses and glass compositions are well-known which possess physical properties essentially equivalent to the glasses and glass compositions described herein. Additionally, many other devitrifiable and non-devitrifiable glasses and glass compositions are generally known which exhibit the requisite relationships established by the foregoing description of the present invention.

I claim:

1. A method of making a body composed at least partially of devitrified glass comprising the steps of mixing together different glasses in finely-divided form and including in said mixture in an amount at least 10% by volume thereof a devitrifiable glass having a devitrification temperature below the fiber softening temperature of the remaining glass in the resultant mixture, heating said mixture to the devitrification temperature of said devitrifiable glass, maintaining the resultant mixture at the devitrification temperature of said devitrifiable glass for a sufficient time to cause devitrification of said devitrifiable glass to occur and form a crystalline skeletal lattice network within the resultant mixture, then heating said mixture above the fiber softening temperature of the remaining glass in the resultant mixture without exceeding the liquidus temperature of the devitrified glass, then permitting said mixture to cool to a temperature below the fiber softening temperature of the remaining glass in the resultant mixture to form another skeletal lattice in interlocking relationship with the crystalline skeletal lattice formed by the devitrification of said devitrifiable glass.

2. A method of making a shaped body composed at least partially of devitrified glass comprising the steps of forming a powdered glass mixture by mixing together at least two different glasses in powdered form, one of said glasses being devitrifiable glass composing at least 10 percent by volume of the mixture and having a devitrification temperature at least 100° C. below the fiber softening temperature of at least 55 percent by volume of the total glass in the mixture, heating said mixture to at least the devitrification temperature of said devitrifiable glass, maintaining the mixture at the devitrification temperature of said devitrifiable glass for a sufficient time to cause devitrification of said devitrifiable glass to occur and form a continuous skeletal network of devitrified glass within the mixture, further heating said mixture to within 10° C. of the fiber softening temperature of the remaining glass in the mixture without exceeding the liquidus temperature of the devitrified glass, then permitting said mixture to cool to a temperature below the fiber softening temperature of the remaining glass in the mixture to form another continuous skeletal network interlocking in and around the skeletal network formed by the devitrification of said devitrifiable glass.

3. A method according to claim 2, wherein at least one of said different glasses is a non-devitrifiable glass.

4. A method according to claim 2, wherein all of the other glass in the resultant mixture is a non-devitrifiable glass.

5. A method according to claim 2, wherein at least a portion of the other glass in the mixture is another devitrifiable glass possessing a fiber softening temperature which is at least 100° C. above the devitrification temperature of the first-mentioned devitrifiable glass.

6. A method according to claim 2, wherein all of the other glass in the resultant mixture is a divitrifiable glass possessing a fiber softening temperature which is at least 100° C. above the devitrification temperature of the first mentioned devitrifiable glass.

7. A method according to claim 4, wherein said devitrifiable glass when in a devitrified condition and said non-devitrifiable glass possess coefficients of thermal expansion which over the temperature range of 0–300° C. do not differ by more than $10 \times 10^{-7}$ per ° C.

8. A method according to claim 6, wherein said devitrifiable glasses when in a devitrified condition possess coefficients of thermal expansion which over the temperature range of 0–300° C. do not differ by more than $10 \times 10^{-7}$ per ° C.

9. A method of making a shaped body composed at least partially of devitrified glass comprising the steps of pre-shaping a mixture composed of at least 10% by volumn of a powdered devitrifiable glass and at least one other powdered glass, said devitrifiable glass having a devitrification temperature at least 100° C. below the softening temperature at least 55 percent by volume of the total powdered glass in said mixture, devitrifying said devitrifiable glass by subjecting the pre-shaped mixture to the influence of heat for a sufficient time to cause said devitrifiable glass to form a skeletal lattice network of devitrified glass within the pre-shaped mixture, then softening and fusing said other powdered glass by subjecting the pre-shaped mixture to the influence of sufficient heat to raise the temperature of the pre-shaped mixture to within 10° C. of the fiber softening temperature of said other glass without exceeding the liquidus temperature of the devitrified glass, then cooling the pre-shaped mixture to a temperature below the fiber softening temperature of said other glass.

10. A method of making a body composed at least partially of devitrified glass comprising the steps of forming a mixture composed of at least 10% by volume of a powdered devitrifiable glass and at least one other powdered glass, said devitrified glass having a devitrification temperature at least 100° C. below the softening temperature of at least 55 percent by volume of the total powdered glass in said mixture devitrifying said devitrifiable glass by subjecting the pre-shaped mixture to the influence of heat for a sufficient time to cause said devitrifiable glass to form a skeletal lattice network of devitrified glass within the mixture, then softening and fusing said other powdered glass under the influence of heat sufficiently to soften and fuse said other powdered glass without exceeding the liquidus temperature of the devitrified glass.

References Cited

UNITED STATES PATENTS

| | | | |
|---|---|---|---|
| 3,170,805 | 2/1965 | McMillan et al. | 65—33 XR |
| 3,246,972 | 4/1966 | Smith | 65—33 |
| 3,282,711 | 11/1966 | Lin | 65—33 XR |

S. LEON BASHORE, Primary Examiner

FRANK W. MIGA, Assistant Examiner

U.S. Cl. X.R.

65—33, 60; 106—39; 117—125